United States Patent [19]

Elsbett et al.

[11] Patent Number: 4,800,855
[45] Date of Patent: Jan. 31, 1989

[54] SPONTANEOUS-COMBUSTION ENGINE

[76] Inventors: Ludwig Elsbett; Günter Elsbett; Klaus Elsbett, all of Industriestrasse 14-16, D-8543 Hilpoltstein, Fed. Rep. of Germany

[21] Appl. No.: 110,360

[22] Filed: Oct. 19, 1987

[30] Foreign Application Priority Data

Oct. 20, 1986 [DE] Fed. Rep. of Germany ....... 3635554

[51] Int. Cl.$^4$ .................. F02B 23/06; F02B 17/00; F02F 3/26
[52] U.S. Cl. .................................................... 123/276
[58] Field of Search .................. 123/276, 279, 193 P

[56] References Cited

U.S. PATENT DOCUMENTS

| | | | |
|---|---|---|---|
| 3,302,627 | 2/1967 | Morris | 123/276 |
| 4,286,556 | 9/1981 | Neitz et al. | 123/279 |
| 4,368,702 | 1/1983 | Finsterwalder et al. | 123/276 X |
| 4,593,660 | 6/1986 | Elsbett et al. | 123/193 P |
| 4,709,672 | 12/1987 | Ishida | 123/276 X |

FOREIGN PATENT DOCUMENTS

| | | | |
|---|---|---|---|
| 0170821 | 10/1983 | Japan | 123/276 |
| 2118244 | 10/1983 | United Kingdom | 123/276 |

*Primary Examiner*—Willis R. Wolfe
*Attorney, Agent, or Firm*—Peter K. Kontler

[57] ABSTRACT

A diesel engine wherein the crown of the piston has a flat end face provided with a centrally located circular combustion chamber and with an annular recess which surrounds and communicates with the combustion chamber and receives the tip of the fuel injection nozzle when the piston completes its compression stroke. At such time, the nozzle is close to but is still of contact with the piston. The tappets of first and second valves, which are installed in the head of the cylinder and respectively serve to admit air into and to permit evacuation of combustion products from the combustion chamber, overlap the end face of the piston to such an extent that they cannot bend the shafts of the respective valves if and when engaged and shifted axially by the piston during movement of the latter toward the top center of its compression stroke.

12 Claims, 1 Drawing Sheet

SPONTANEOUS-COMBUSTION ENGINE

BACKGROUND OF THE INVENTION

The invention relates to improvements in spontaneous-combustion engines, especially to improvements in the pistons and cylinders of such engines. More particularly, the invention relates to improvements in engines (such as diesel engines) of the type wherein the combustion chamber is provided in the end face of the head or crown of the piston which reciprocates in the barrel of a cylinder and receives fuel and air through the head of the cylinder. Still more particularly, the invention relates to improvements in engines wherein the combustion chamber in the end face of the piston is surrounded by an annular groove or recess.

It is already known to provide the end face of the cylinder in a diesel engine with a recess which surrounds and communicates with the combustion chamber. Reference may be had, for example, to German Auslegeschrift No. 11 08 001 wherein the combustion chamber has a circular outline and the cylinder head has means for injecting fuel in such a way that the injected fuel impinges upon the surface surrounding the combustion chamber in close proximity to the open end of the chamber, i.e., at the end face of the piston crown. The purpose of the recess around the combustion chamber is to collect droplets of fuel which impinge upon and rebound from the surface surrounding the combustion chamber proper. The Auslegeschrift points out that spraying of fuel onto a hot surface results in quieter operation of the engine and reduces the fuel-sensitivity of the engine. The spray or sprays of fuel are to be injected in such a way that they contact the hottest portion of the surface bounding the combustion chamber, i.e., adjacent the end face of the crown. The depth of the recess is selected with a view to ensure that particles of fuel which rebound from the surface surrounding the combustion chamber are gathered in the recess instead of being propelled beyond the end face of the crown.

FIG. 1 of German Offenlegungsschrift No. 34 27 065 discloses a different piston whose end face is also formed with a combustion chamber and which has a chamfered surface surrounding the open end of the chamber. The reference does not point out the reasons and/or advantages of such configuration of the surface bounding the outermost portion of the combustion chamber. The reference also fails to disclose or suggest the optimum dimensions of the space within the chamfered portion of the surface.

German Offenlegungsschrift No. 33 43 677 discloses an engine for spontaneous combustion of liquid fuels wherein the end face of the piston is again provided with a circular combustion chamber. When the piston reaches the upper end of its stroke, the entire supply of admitted fuel and air is confined in the chamber. The admitted air is caused to circulate and causes circulation of fuel which is injected by a nozzle whose axis is inclined with reference to the axis of the piston. This induces the centrifugal force acting upon the contents of the combustion chamber to force the heavier cold air toward the surface bounding the chamber and to force the hot mixture of fuel and air toward the center of the chamber. In order to avoid the presence of pronounced edges which could interfere with the circulation of air and fuel in the combustion chamber, the conventional space for the tip of the fuel injection nozzle is replaced with a chamfered surface which is formed in a milling or like machine. This reference further proposes to provide the chamfered surface with a large outer diameter because this is supposed to ensure that the combustion products encounter little resistance during flow from the combustion chamber into the interior of the cylinder.

OBJECTS AND SUMMARY OF THE INVENTION

An object of the invention is to provide an engine, particularly a diesel engine, which is constructed and assembled in such a way that the piston is prevented from bending and similarly deforming the valves which control the admission of air into and the evacuation of combustion products from the combustion chamber.

Another object of the invention is to provide a novel and piston for use in the engine.

A further object of the invention is to provide a novel and improved cylinder for use in the engine.

An additional object of the invention is to provide an engine wherein the piston interferes little or not at all with the inflow of air into and/or with the outflow of combustion products from the combustion chamber.

The invention is embodied in a spontaneous ignition engine, particularly a diesel engine, which comprises a cylinder having a barrel and a head at one end of the barrel, and a piston which includes a crown having an end face and a circular combustion chamber at the center of the end face. The end face of the piston is further formed with an annular recess which surrounds and communicates with the combustion chamber, and the engine further comprises a fuel injection nozzle which is provided in the head of the cylinder and includes an exposed fuel discharging portion or tip projecting from the head. The piston is reciprocable in the barrel of the cylinder to and from a predetermined position at the top center of its compression stroke, and the aforementioned fuel discharging portion of the nozzle extends into the recess but remains out of contact with the crown in the predetermined position of the piston. The end face preferably includes a flat first annular portion which surrounds the recess, a second annular portion which is offset from the first annular portion in the axial direction of the piston and defines the recess, and a preferably rounded (convex) third or intermediate annular portion which is disposed between and preferably merges gradually into the first and second annular portions. The second annular portion can include a first annular section surrounding that portion of the recess which is nearest to the third annular portion, a second annular section which is remotest from the first annular portion and is preferably slightly inclined relative thereto and is also inclined relative to the first section, and a third annular section which is disposed between and merges gradually into the first and second annular sections. The tip of the nozzle preferably extends into close or immediate proximity of the second annular section of but is still out of contact with the second annular portion of the end face in the predetermined position of the piston.

The cylinder head contains two valves one of which serves to admit air into the combustion chamber and the other of which serves to evacuate combustion products from the combustion chamber. The valves have preferably circular tappets including portions which overlie parts of the combustion chamber and of the annular recess, and portions which overlap the first annular portion of the end face of the piston. The circular outline of each tappet preferably intersects the edge between the recess and the first annular portion of the end face of the crown of the piston at two spaced-apart locations, and such locations are preferably disposed on a first line extending at right angles to a second line which crosses the axis of the piston and extends at right angles to the first line. The tappets can be disposed at opposite sides of a plane which includes the axis of the piston. The latter can include a first section and a second section. The first section is located between the valves and the second section, and its crown is provided with the aforementioned combustion chamber and recess.

The novel features which are considered as characteristic of the invention are set forth in particular in the appended claims. The improved engine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
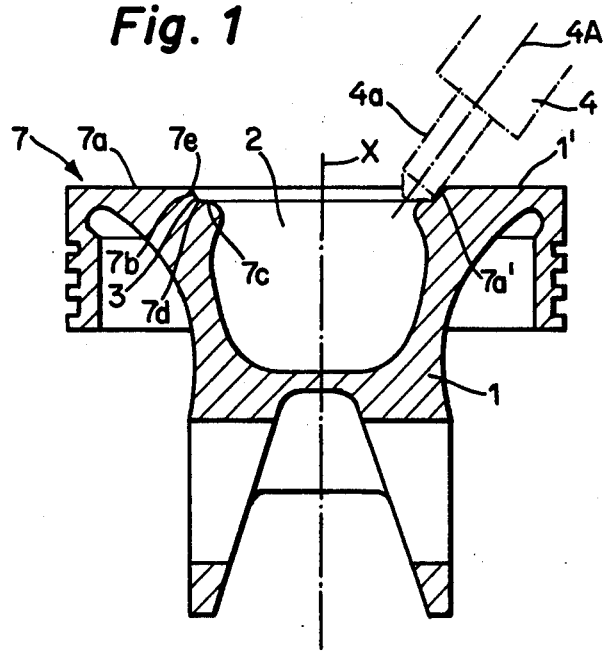
FIG. 1 is an axial sectional view of a first section of a composite piston forming part of a spontaneous-combustion engine which embodies the present invention, the fuel injection nozzle being indicated by phantom lines.
Figure 1A:
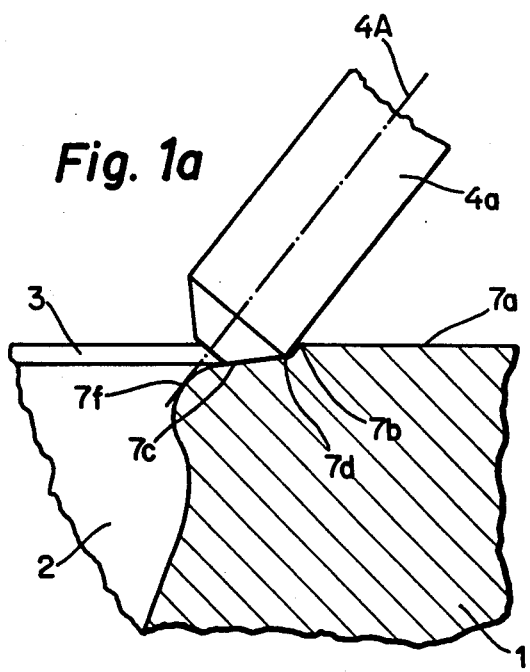
FIG. 1a is an enlarged view of a detail in the structure of FIG. 1.
Figure 3:
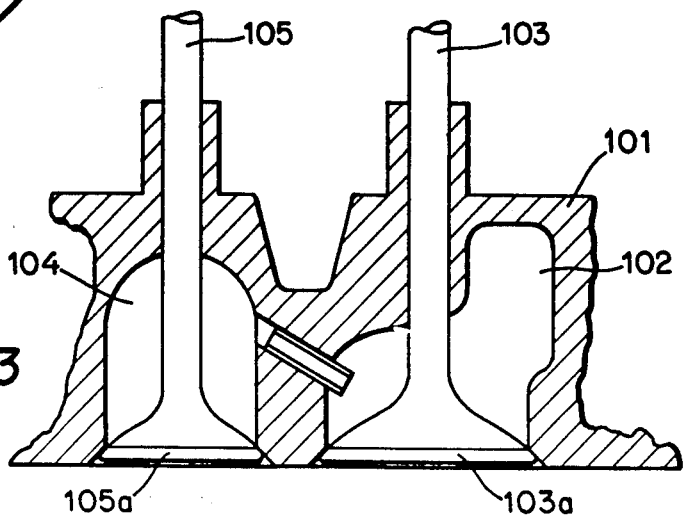
FIG. 3 is an enlarged fragmentary sectional view of the head of the cylinder whose barrel receives the piston including the piston section of FIGS. 1 and 2.

Referring first to FIGS. 1 and 1a, there is shown the first section 1 of a composite piston which can be used in a diesel engine further including a cylinder having the head 101 of FIG. 3. The section 1 can form part of a composite piston of the type disclosed in commonly owned U. S. Pat. No. 4,593,660 granted June 10, 1986 to Ludwig and Günter Elsbett for "Piston drive for use in diesel engines or the like". The disclosure of this patent is incorporated herein by reference. The piston section 1 is further similar to that which is disclosed in our copending patent application Ser. No. 118,186 filed Nov. 6, 1987 for "Internal combustion engine with combined cooling and lubricating system", still pending.

The end face 7 of the head or crown 1' of the piston section 1 has a centrally located circular combustion chamber 2 and an annular recess or groove 3 which surrounds and communicates with the chamber 2 and has a predetermined depth and width such that it can receive the fuel-discharging end portion or tip 4a of a fuel injection nozzle 4 whose axis 4A is inclined with reference to the axis X of the piston section 1.

The end face 7 has a flat first annular portion 7a which surrounds the recess 3 and has a circular edge 7a' immediately adjacent the recess. A second annular portion of the end face 7 includes a slightly concave first annular section 7b which is inclined with reference to the surface portion 7a and actually surrounds the recess 3, a second section 7c which is located at the bottom of the recess 3 and is slightly inclined (e.g., at an angle of approximately 6°) with reference to the annular portion 7a, a third or intermediate section 7d which is located between and merges gradually into the sections 7b, 7c and a convex fourth section 7f. The axis 4A is substantially tangential to the section 7f. A third or intermediate annular portion 7e of the end face 7 is convex and is disposed between and merges into the first portion 7a as well as into the first section 7b of the second portion.

FIG. 1 shows the piston section 1 at the top center of its stroke, i.e., in a predetermined position in which the end face 7 is nearest to the head 101 of the cylinder. At such time, the tip 4a of the nozzle 4 is immediately or closely adjacent the section 7c but is out of actual contact with any part of the end face 7. In other words, the tip 4a extends into the recess 3 but does not contact the piston section 1.

Figure 2:
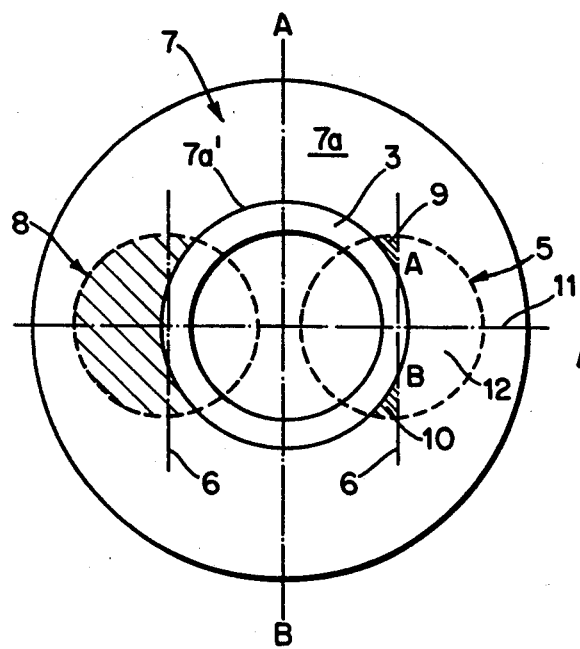
FIG. 2 is a plan view of the piston section of FIG. 1 with the nozzle omitted and further showing the outlines of the tappets of two valves which are installed in the head of the associated cylinder.

The cylinder head 101 of FIG. 3 defines a first passage 102 for admission of air into the combustion chamber 2 and a second passage 104 for evacuation of combustion products from the chamber 2. The flow of air from the passage 102 into the chamber 2 is controlled by a first valve 103 having a tappet 103a with a circular outline 5 (see FIG. 2). The tappet 105a of the valve 105 which controls the flow of combustion products from the chamber 2 into the passage 104 has a circular outline 8 (FIG. 2). It will be seen that the flat portion 7a of the end face 7 of the crown 1' of the piston section 1 extends radially outwardly beyond the outlines 5 and 8 but that such outlines overlie portions of the chamber 2 and recess 3 at opposite sides of a symmetry plane A-B which includes the axis X of the piston section 1. The lines 6 cross the axes of the valves 103, 105 and of their tappets 103a, 105a and are parallel to the plan A-B and normal to a line 11 which crosses the axis X of the piston section 1. The spaced-apart locations or points where the lines 6 intersect the edge 7a' of the end face portion 7a around the recess 3 are shown at A and B. The points or locations A and B are located within the outlines 5 and 8 of the respective tappets 103a and 105a. The area 12 of overlap between each of the tappets 103a, 105a and the annular portion 7a is such that it has portions 9 and 10 extending beyond the respective line 6, namely toward the plane A-B. Such positioning of the tappets 103a, 105a with reference to the piston section 1 reduces the likelihood of or prevents any bending or tilting of shafts of the valves 103, 105. Bending could result in damage to or improper operation of these valves. The cylinder head 101 of FIG. 3 is or can be identical with that disclosed in our copending patent application Serial No. 118,187 filed Nov. 6, 1987 for "Cylinder head for use in internal combustion engines", still pending.

An important advantage of the improved engine is that the tip 4a of the fuel injection nozzle 4 can extend into immediate proximity of the combustion chamber 2 when the piston section 1 reaches the predetermined position of FIG. 1. Moreover, the valves 103 and 105 are not subjected to any, or to any noticeable, tilting or bending stresses so that the useful life of these valves in long and each of these valves can open or close at the prescribed stages of operation of the engine. This reduces the need for frequent inspection, repair and/or replacement of the valves in contrast to conventional engines wherein the valves in the head of the cylinder are likely to be deformed or damaged during initial assembly of the engine as well as in the course of inspection, maintenance or repair work. As a rule, neither the piston nor the cylinder of a diesel engine is formed with pockets for the tappets of air admitting valves and/or of valves which serve to evacuate combustion products, and this also contributes to the likelihood of deformation of (or even more serious damage to) the valves in conventional diesel engines. An additional reason for the likelihood of bending of shafts for the tappets of valves in conventional engines is that the intervals of time during which the piston must dwell at the top center of its compression stroke and/or during which the valving elements (such as tappets) of the valves in the cylinder head must remain open or closed are extremely short. The reason for the absence of pockets for the tappets of the valves, either in the piston or in the cylinder, is that such pockets could interfere with proper circulation of air, fuel-air mixture and/or combustion products. If the piston in a conventional engine strikes against the tappets during movement toward its predetermined position, it is likely to damage or bend the tappets if the respective valves are not fully closed at the time the piston completes its compression stroke. Reference may be had to the aforediscussed German Offenlegungsschrift No. 33 43 677 which shows that, if the marginal portion of the combustion chamber in the end face of the piston is configurated in a manner as proposed in the reference, the piston is not only likely but actually certain to bend or flex the shafts of the tappets if the valves are not fully closed while being approached by the piston which is in the process of performing its compression stroke.

It has been found that the engine which is shown in FIGS. 1 to 3 is capable of preventing any flexing of the shafts of the valves 103 and 105 by the piston section 1 in view of the aforediscussed configuration of the recess 3 and also in view of the aforediscussed dimensioning and positioning of the flat portion 7a of the end face 7 of the piston section 1 relative to the tappets 103a and 105a. This holds true even if the tappets 103a and 105a must move downwardly (as seen in FIG. 3) well beyond the underside of the head 101 when a circulating mass of air is to flow from the passage 102 into the chamber 2 or when combustion products are to flow from the chamber 2 into the passage 104.

It has been found that, when the piston performs its return stroke to transmit torque to the crankshaft of the engine, air which is drawn into the space between the head 101 and the end face 7 of the piston section 1 is not likely to develop turbulence, even in its cold outer layer, so that the flow of air remains laminar and the cold stratum of inflowing air establishes a highly satisfactory heat-insulating layer between hot combustion products and the surface surrounding the cylinder chamber 2. In spite of such mode of admitting air into the cylinder, the tappets 103a, 105a are in large-area contact with the flat portion 7a of the end face 7 of the piston section 1 so that they are not likely to be tilted but merely move back against their seats in the cylinder head 101. In other words, the configuration and dimensions of the area of contact between a tappet and the ascending piston section 1 are such that the shafts which carry the tappets are not subjected to any, or are subjected to negligible, bending stresses.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a spontaneous-ignition engine, the combination of a cylinder; a piston including a crown having an end face and a circular combustion chamber in said end face, said end face further having a shallow annular recess surrounding and communicating with said chamber; and a fuel injection nozzle provided in said cylinder and having an exposed fuel discharging portion, said piston being movable relative to said cylinder to and from a predetermined position at the top center of its compression stroke and said portion of said nozzle extending into said recess but remaining out of contact with said crown in said predetermined position of said piston.

2. The combination of claim 1, wherein said end face includes a flat annular portion surrounding said recess, said nozzle being inclined with reference to the axis of said piston.

3. The combination of claim 2, further comprising at least one reciprocable valve installed in said cylinder and having a tappet partially overlapping said chamber and said recess and overlying said flat portion of said end face in said predetermined position of said piston.

4. The combination of claim 3, wherein said flat portion of said end face extends radially of said piston beyond said tappet.

5. The combination of claim 2, wherein said end face has a second annular portion which is offset from said flat annular portion in the axial direction of said piston and surrounds said chamber, said recess being defined by said second annular portion and said fuel discharging portion being immediately or closely adjacent said second annular portion in said predetermined position of said piston.

6. The combination of claim 1, wherein said end face has a substantially flat first annular portion surrounding said recess, a second annular portion defining said recess, and an intermediate annular portion disposed between and merging gradually into said first and second annular portions.

7. The combination of claim 6, wherein said second annular portion includes a first section which is inclined relative to said first annular portion and merges into said intermediate portion, a second section which is slightly inclined relative to said first annular portion, and a third section disposed between and merging gradually into said first and second sections.

8. The combination of claim 1, wherein said end face includes a flat annular portion which surrounds said recess and has a substantially circular edge adjacent said recess, and further comprising at least one valve reciprocably installed in said cylinder and having a circular tappet adjacent said end face in said predetermined position of said piston, the outline of said tappet intersecting said edge at two spaced-apart locations on a first line which extends through the axis of said tappet and is normal to a second line crossing the axis of said piston.

9. The combination of claim 8, wherein said tappet overlies a portion of said chamber and a portion of said recess as well as a part of said flat portion of said end face.

10. The combination of claim 8, further comprising a second valve installed in said cylinder and having a tappet, said tappets being disposed at opposite sides of a plane including the axis of said piston and parallel to said first line.

11. The combination of claim 1, wherein said piston includes two coaxial sections including a first section nearer to and a second section more distant from said nozzle, said chamber and said recess being provided in said first section.

12. In a spontaneous-ignition engine, the combination of a cylinder; a piston including a crown having an end face and a circular combustion chamber in said end face, said end face further having an annular recess surrounding and communicating with said chamber and said end face including a flat annular portion which surrounds said recess and has a substantially circular edge adjacent said recess; a fuel injection nozzle provided in said cylinder and having an exposed fuel discharging portion, said piston being movable relative to said cylinder to and from a predetermined position at the top center of its compression stroke and said portion of said nozzle extending into said recess but remaining out of contact with said crown in said predetermined position of said piston; and at least one valve reciprocably installed in said cylinder and having a circular tappet adjacent said end face in said predetermined position of said piston, the outline of said tappet intersecting said edge at two spaced-apart locations on a first line which extends through the axis of said tappet and is normal to a second line crossing the axis of said piston, said tappet overlying a portion of said chamber and a portion of said recess as well as a part of said flat portion of said end face.

* * * * *